Oct. 14, 1924.
J. J. McGUCKIN
CYLINDER GAUGE
Filed July 13, 1921
1,511,624
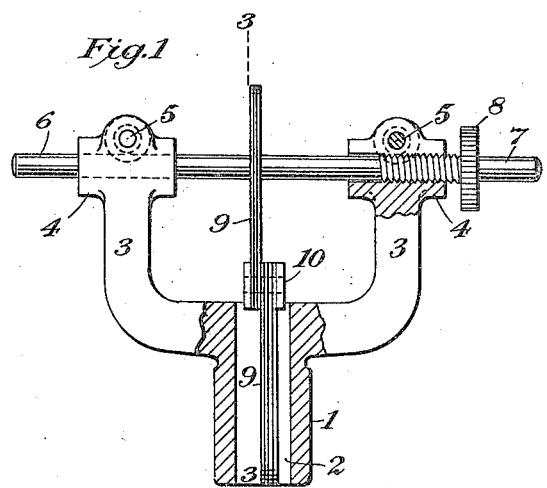
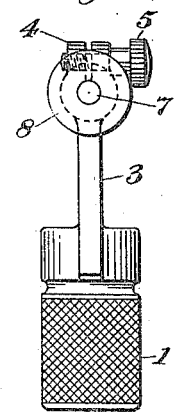
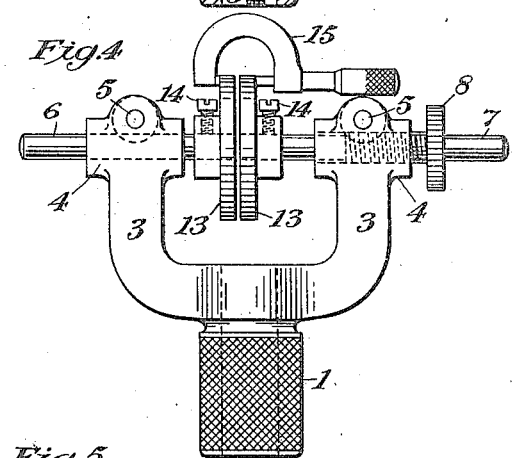
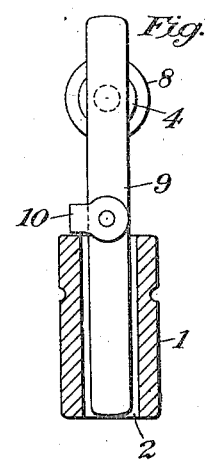
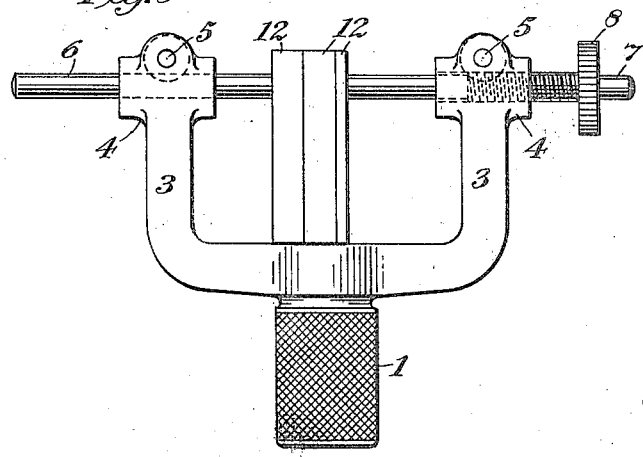
INVENTOR
John J. McGuckin.
BY
Andrew Wilson.
ATTORNEY.

Patented Oct. 14, 1924.

1,511,624

UNITED STATES PATENT OFFICE.

JOHN J. McGUCKIN, OF BROOKLYN, NEW YORK, ASSIGNOR TO LOUIS SCHWAB, DOING BUSINESS UNDER THE BUSINESS NAME OR STYLE OF STEVENS & COMPANY, OF NEW YORK, N. Y.

CYLINDER GAUGE.

Application filed July 13, 1921. Serial No. 484,294.

*To all whom it may concern:*

Be it known that I, JOHN J. McGUCKIN, a citizen of the United States, residing at Brooklyn, Kings County, New York, have invented certain new and useful Improvements in Cylinder Gauges, of which the following is a specification.

My invention relates particularly to improvements in gauges which are adapted to measure, with a high degree of accuracy, the diameter of the bores in cylinders, such for instance as the cylinders of an internal combustion engine; and my improvements are directed particularly to providing means whereby the displacement of certain simple and easily operable elements may be measured with accuracy by supplementary elements having the nature of a micrometer or thickness gauge.

In the drawings, Fig. 1 is an elevation, partly in section, of mechanism embodying my invention; Fig. 2 is a side view, looking to the left on Fig. 1, and omitting the thickness gauge; Fig. 3 is a vertical sectional view, taken as on the line 3—3 of Fig. 1, looking to the right; Fig. 4 is an elevation of the gauge with certain auxiliary elements attached; and Fig. 5 is an elevation of a gauge wherein the displacement is measured with Johansson blocks.

Similar letters of reference indicate similar parts in all the figures.

A handle 1, preferably provided with a central bore 2, carries two bracket arms, 3, 3, the free ends of which are provided with bearings 4, 4, preferably split and contractible by means of thumb screws 5, 5. In these bearings are mounted rods 6, 7, which may be adjusted back and forth therein, the rod 7 being shown as threaded through its bearing and as being provided with a finger wheel 8 by means of which the rod may be turned conveniently. The rods may be clamped in their bearings by tightening the screws 5, 5.

These rods are made of certain accurately predetermined lengths; and their combined lengths may be regarded as forming the base element of any measurements to be taken. Thus if the combined lengths of the rods amount, for instance, to four inches, and they are separated a given distance, for instance, one tenth of an inch, it is plain that the outer ends of the rods will be four and one tenth inches from each other; and that that measurement may be verified by accurately measuring the distance between the inner ends of the rods and adding that distance to the lengths of the rods.

Rods of several lengths may be used interchangeably with the same instrument. So that bores of different diameters may be measured approximately by the selection of rods making up slightly less than the diameter of any particular bore, then separating the rods until their outer ends contact with the inside of the bore, and then measuring the distance between their inner ends and adding it to the combined lengths of the rods.

The distance between the ends of the rods may be measured conveniently by the use of a thickness gauge such as is indicated by 9 in Figs. 1 and 3, and is made up of a number of thin metal plates, pivoted together at one end, so that one or more may be separated from the others and may be fitted into the opening between the ends of the rods 6, 7 so as to accurately measure that opening. This thickness gauge is preferably so proportioned that part of its plates may be passed down within the hollow handle 1, but will be held from sliding entirely through the handle by the loop 10 resting upon the upper edge of the bore. When thus placed, the plates of the gauge 9 will be in line with the longitudinal axis of the handle 1, and the whole instrument may be conveniently slipped into a bore which is being measured, for the purpose of a further test, without danger of the thickness gauge striking the sides of the bore or being bent or broken.

In Fig. 5 I have illustrated the measurement as being made with the aid of Johansson blocks, 12, 12, the face of the yoke between the arms 4, 4 being adapted to afford a suitable support for such blocks.

And in Fig. 4 I have shown a modification wherein hubbed discs 13, 13, centrally bored to slip over the ends of the rods 6, 7, are secured to the rods by set screws 14, 14, so that in the nominal or initial position of the instrument the faces of the discs will be in contact with each other. Hence, if the rods 6 and 7 are moved away from each other, as in measuring the inside diameter of a cylinder, the extent of the separation may be measured by applying a small micrometer 15 to the discs, as shown in Fig. 4; and, after making a proper deduction for the thickness of the discs, the micrometer reading may be added to the length of the rods to give the desired measurement.

It will be seen that by the use of my device the major portion of the measurement is made with standardized elements which may be readily adjusted to cover the measured distance, and which may be so adjusted without the movement of delicate or highly accurate micrometer elements, or the like; and that the element of separation between the standardized elements may then be accurately measured by a small micrometer or the like.

Hence, my improved gauge furnishes the mechanic with a simple tool with which he can measure bores of widely varying diameters, the measurements being accurately completed by the cooperative operation of a small, accurate instrument with the standardized elements of the gauge.

This enables the mechanic to dispense with the use of a number of expensive micrometers of varying ranges of measurement, and to take his various inside measurements by the use of my simple base gauge in combination with a micrometer or its equivalent.

It is obvious that details of the embodiment of my invention may be further modified, as by the use of mechanical equivalents, or the like, without departing from the spirit of the invention and the scope of the claim.

Having thus described my invention, what I claim and desire to secure by Letters Patent of the United States, is:—

In a cylinder bore gauge, the combination of a frame provided with opposed arms, rods constituting measuring elements of accurately predetermined lengths adjustably supported by said arms in the line of a common axis, an integral extension projecting outwardly from said frame and having a central bore the extended axis of which will intersect the line of axis of said rods, a thickness gauge embodying a plurality of pivoted plates longer than the distance from the mouth of the bore to the common axis of the rods and insertable within said bore, and provided with a common element pivotally connected thereto, larger than the diameter of said bore, and disposable to support selected plates across the common axis of said rods and the remaining plates within the bore of said extension.

JOHN J. McGUCKIN.